United States Patent [19]

Piccone et al.

[11] 3,886,432

[45] May 27, 1975

[54] OVERVOLTAGE PROTECTIVE CIRCUIT FOR HIGH POWER THYRISTORS

[75] Inventors: Dante E. Piccone, Philadelphia; Istvan Somos, Lansdowne, both of Pa.

[73] Assignee: General Electric Company, Philadelphia, Pa.

[22] Filed: Feb. 21, 1974

[21] Appl. No.: 444,605

[52] U.S. Cl............... 321/11; 307/252 L; 321/27 R
[51] Int. Cl. ............................................ H02h 7/14
[58] Field of Search............ 307/252 L; 321/11, 12, 321/13, 14, 27 R; 317/33 SC

[56] References Cited
UNITED STATES PATENTS

| | | | |
|---|---|---|---|
| 3,023,353 | 2/1962 | Currey | 321/14 X |
| 3,287,576 | 11/1966 | Motto, Jr. | 321/27 R |
| 3,358,218 | 12/1967 | Halpin | 321/11 X |
| 3,461,319 | 8/1969 | Motto, Jr. et al. | 307/252 L |
| 3,513,328 | 5/1970 | Auger, Jr. | 307/252 L |
| 3,573,550 | 4/1971 | Baker | 317/33 SC |
| 3,599,075 | 8/1971 | Etter et al. | 321/11 |
| 3,626,271 | 12/1971 | Dewey | 321/11 |
| 3,662,250 | 5/1972 | Piccone | 321/11 |
| 3,794,908 | 2/1974 | Lindblom et al. | 307/252 L X |

*Primary Examiner*—William H. Beha, Jr.
*Attorney, Agent, or Firm*—J. Wesley Haubner; Albert S. Richardson, Jr.

[57] ABSTRACT

A high-power main thyristor is protected from forward voltage breakover by connecting in parallel relationship therewith an overvoltage responsive trigger scheme comprising a plurality of PNPN and PN semiconductor elements which are connected in series with one another between the anode and the gate of the main thyristor and a capacitor which is connected between the gate and the cathode. The PNPN elements are selected to turn on in a voltage breakover mode, thereby triggering the main thyristor, when the forward bias voltage on the latter attains a predetermined threshold magnitude which is lower than the breakover level of the thyristor. To expand the permissible range of application of this protective circuit, means is provided for limiting the increase in the threshold magnitude of forward bias voltage with increasing rates of rise thereof, and means is provided for dividing among the PNPN and PN elements any reverse voltage appearing across the main thyristor.

9 Claims, 5 Drawing Figures

OVERVOLTAGE PROTECTIVE CIRCUIT FOR HIGH POWER THYRISTORS

This invention relates generally to an electric protective circuit for triggering a relatively high-current, high-voltage solid-state controlled switching device when a forward bias voltage of appreciable magnitude is impressed on the device, and more particularly it relates to improvements in the thyristor overvoltage protective circuit that is described and claimed in U.S. Pat. No. 3,662,250 granted to the present inventors on May 9, 1972, and assigned to the General Electric Co.

The following U.S. Pat. Nos. are indicative of prior approaches in the pertinent art: 2,585,796-Lamm, 3,293,449-Gutzwiller, 3,405,344-Boksjo et al, 3,573,550-Baker, and 3,626,271-Dewey.

"Thyristor" is a generic name for a family of solid-state bistable switches, including silicon controlled rectifiers (SCRs), which are physically characterized by a semiconductor wafer having a plurality of layers of alternately P- and N-type conductivities between a pair of main current-carrying metallic electrodes (designated the anode and the cathode, respectively). When connected in series with a load impedance and subjected to a forward bias voltage (anode potential positive with respect to cathode), a thyristor will ordinarily block the flow of load current until triggered or "fired" by the application to its gating means of an appropriate control signal, whereupon it abruptly switches from a high resistance to a very low-resistance, forward conducting (on) state. Subsequently the device reverts to its non-conducting (turned off) state in response to through current being reduced below a given holding level.

The forward current and peak blocking voltage ratings of a thyristor are specified by the manufacturer. These ratings determine, under stated conditions and without damaging the thyristor, the maximum load current that the thyristor can conduct when on and the maximum applied voltage that it can safely withstand when off. High-current ratings are generally obtained by using relatively large area semiconductor wafers, while high-voltage ratings require relatively thick base layers in the wafers. Thus, by way of example, a thyristor having a forward current rating of 1,250 amperes average and a repetitive peak forward blocking voltage rating of 2,600 volts at an operating junction temperature of 70° C may have a wafer whose area is approximately 3.0 square inches and whose thickness is approximately 0.03 inch. For higher voltage applications, a plurality of such thyristors can be interconnected in series and operated in unison to form a solid-state controllable electric valve. One such application is in the field of high-voltage direct-current power transmission where a plurality of such valves are interconnected and arranged to form a high-current converter for controlling the flow of bulk electric power between d-c and a-c sections of a high-voltage power transmission system.

During those cyclically recurring intervals when the above-mentioned converter valve is in an off or blocking state, the valve and its associated equipment are prone to being damaged by extra high voltage surges that may be produced by a variety of different transient phenomena, such, for example, as lightning strokes, bushing flashovers, or inverter commutation failure. Lightning arresters are commonly used to harmlessly divert and suppress overvoltage transients, but it is believed impractical and unwise to rely solely on such arresters to protect solid-state valves when exposed to abnormal voltage surges in the forward direction. In addition, since the arrester is usually connected across the whole valve, there is no guarantee that each constituent thyristor of the valve will not individually be subjected to excessive voltage. If a surge of forward anode voltage on an individual thyristor were to increase to a critical level above rated peak off-state voltage, the thyristor will turn on due to a voltage breakover. This mode of turn on, which can be caused by an avalanche breakdown, a punch through, or excessive leakage, is a known phenomenon in the thyristor art. It is also known that the normal di/dt capabilities of conventional high-voltage thyristors (e.g., thyristors having peak blocking voltages over 1,500 volts) are greatly reduced when turned on in this mode.

In our above-referenced prior patent, an improved overvoltage responsive trigger scheme is disclosed for protecting a high-power main thyristor from forward voltage breakover. The protective circuit comprises a plurality of lower voltage PNPN semiconductor elements connected between the anode and the gate of the main thyristor and a series L-C circuit connected between the gate and the cathode. The PNPN elements are selected to turn on in a voltage breakover mode when the forward bias voltage on the main thyristor attains a predetermined threshold magnitude which is lower than the breakover level of the thyristor, whereupon the latter is triggered by a sharp gate punch before the voltage attains a destructively high level.

While the aforesaid overvoltage protective circuit has worked well in practice, it has been found to have certain characteristics that undesirably limit the range of its prospective applications. The requisite coordination between the breakover level of the protective circuit and that of the main thyristor can be jeopardized if the rate of rise of forward bias voltage is extremely high (e.g., 6,000 volts per microsecond) or if a surge of forward voltage is superimposed on an existing reverse bias of high magnitude. Accordingly, a general objective of the present invention is the provision of further improvements in the overvoltage triggering scheme of our prior patent.

Another objective of our invention is to increase the capability of such an overvoltage triggering scheme so as to expand the conditions under which it can safely be applied.

In carrying out our present invention in one form, a main thyristor, or a group of parallel thyristors, is shunted by a protective circuit comprising overvoltage sensing means in series with energy storing means, and the juncture therebetween is coupled to the gating means of the main thyristor. The overvoltage sensing means comprises a plurality of PNPN semiconductor elements in series with at least one PN semiconductor element. The energy storing means comprises a capacitor. The thyristor is triggered when the PNPN elements switch from blocking states to current conducting states in response to forward bias voltage across the thyristor rising to a predetermined threshold magnitude. In accordance with one aspect of our invention, a plurality of resistors are connected across the respective elements of the overvoltage sensing means so as to divide among these elements any reverse voltage appearing across the main thyristor. In another aspect of the invention, a capacitor is associated with one of the PNPN elements of the overvoltage sensing means so as to limit the increase in the aforesaid threshold magnitude of forward bias voltage with increasing rates of rise thereof. Preferably an isolating diode is used between the protective circuit and the gating means of the main thyristor, and a resistor is connected across this diode so as to prevent the accumulation of charge on the capacitor when the main thyristor is reverse biased.

The invention will be better understood and its various objects and advantages will be more fully appreciated from the following description taken in conjunction with the accompanying drawings in which.

Figure 1:
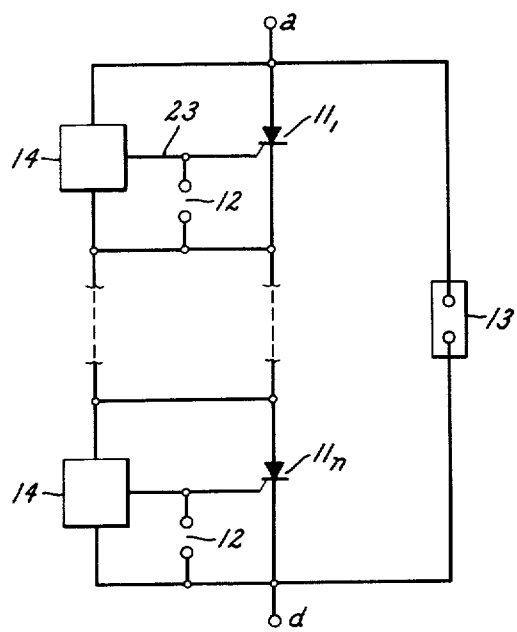
FIG. 1 is a schematic circuit diagram of a solid-state controllable electric valve comprising a series string of high-power thyristors.

Referring now to FIG. 1, a series string of duplicate main thyristors $11_1$ to $11_n$ is shown extending between terminals $a$ and $d$ to form a high-voltage solid-state controllable valve suitable for use with other identical valves in an electric power converter for a high-voltage direct current power delivery system. Each of the main thyristors of the valve is a high-power semiconductor device having relatively large dimensions, and each is equipped with gating means for triggering the thyristor when energized by a compatible control signal in the presence of forward bias on the main electrodes. Although it could take other forms which are known in the art, the gating means that has been shown symbolically in FIG. 1, for purposes of illustration, is a control electrode responsive to a gating current pulse of suitable polarity, magnitude, and duration. Such a control signal is periodically supplied to the thyristor by an external gate drive circuit (not shown) which is connected to a set of control terminals 12.

The voltage rating of the illustrated valve is a multiple of the voltage capability of its constituent thyristors. The current rating depends on the maximum forward current rating of the individual thyristors, and additional parallel thyristors can be used at each level of the valve if desired. In practice the valve will include other power components such as those disclosed in U.S. Pat. No. 3,423,664-Dewey. To turn on the valve, all of its main thyristors are triggered simultaneously, and when the valve is thus fired it can freely conduct load current in a forward direction until subsequently turned off by line voltage commutation.

At various times during each of its cyclic off or non-conducting intervals, the valve shown in FIG. 1 has to withstand high peak voltages which the associated power system normally imposes thereon. In addition, a valve in its off state may be subjected to abnormal voltage surges due to transient phenomena such as lightning strokes or bushing flashovers. To help prevent damage to the valve due to excessively high reverse or forward blocking voltages, a suitable voltage surge suppressor such as the lightning arrester 13 is connected across its terminals $a$ and $d$.

For reasons more fully explained in our prior U.S. Pat. No. 3,662,250, each of the main thyristor levels of the valve is provided with an overvoltage triggering circuit 14. The details of the presently preferred embodiment of one such circuit have been shown schematically in FIG. 2. As is there shown, the overvoltage triggering circuit 14 comprises overvoltage sensing means 15 connected in series with energy storing means 16 between first and second terminals 17 and 18. The first terminal 17 is connected to the anode of the associated main thyristor (e.g., thyristor $11_1$), and the second terminal 18 is connected to the cathode of that thyristor, whereby the serial combination of the overvoltage sensing means 15 and the energy storing means 16 is disposed in parallel circuit relationship with the main thyristor. The triggering circuit also has a third terminal 19 which is connected by way of an isolating diode 20 and a resistor 21 to the juncture 22 of its two parts 15 and 16. The third terminal 19 is coupled to the gate electrode of the associated main thyristor by means of a conductor 23.

The energy storing means 16 of the triggering circuit 14 preferably comprises a capacitor 24 connected in series with an inductor 25. The inductor 25 should have a relatively low value of inductance (e.g., less than 10 microhenries). Where only a single main thyristor is used at each level of the valve (as is shown in FIG. 1), this inductor could be omitted from the energy storing means if a capacitor 24 of ample capacitance were used.

Figure 2:
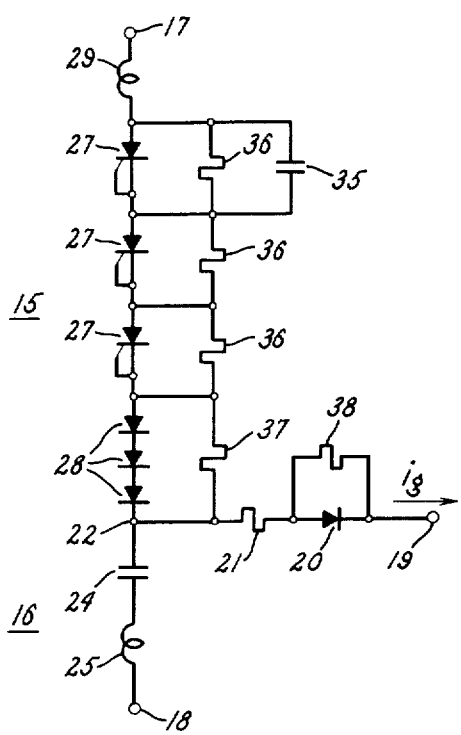
FIG. 2 is a schematic diagram of one of the overvoltage protective circuits depicted in block form in FIG. 1 and embodying our invention.

Preferably the overvoltage sensing means 15 comprises a series combination of unidirectional conducting devices 27 and 28 and an inductor 29. All of the devices 27 and 28 are poled to conduct current in the same direction as the parallel main thyristor. The devices 27 (three are shown in FIG. 2, although more or less can be used in practice) are PNPN semiconductor switching elements which are serially interconnected in polarity agreement with one another. The devices 28 are small PN semiconductor elements which ensure that the overvoltage sensing means 15 will have a reverse blocking voltage rating exceeding that of the associated main thyristor.

Each of the PNPN elements 27 can comprise an auxiliary thyristor having lower voltage and current ratings and smaller size than any of the main thyristors of the valve. Its characteristic breakover voltage value is a predetermined fraction of the total voltage that will exist across the overvoltage sensing means 15 when the forward bias voltage on the associated main thyristor attains a predetermined threshold magnitude, and the predetermined fractions of all of the auxiliary thyristors 27 are respectively selected so that their sum is equal to that total. In one embodiment of our invention, by way of example, this result was obtained by using three General Electric C122 thyristors in series, each having a current rating of 8 amps RMS and a repetitive peak off-state voltage of 400 volts. Such devices can be triggered or turned on in a voltage breakover mode by applying across their respective main electrodes a forward voltage approaching 750 volts. In this example, the peak off state voltage normally applied to the main thyristor is less than 2,000 volts, and hence each of the auxiliary thyristors 27 normally remains in its high-resistance, blocking state. However, if and when the forward bias on the main thyristor rises to a threshold magnitude of approximately 2,200 volts (which magnitude is lower than the breakover level of the main thyristor), each of the auxiliary thyristors is operative to switch abruptly to a low-resistance, unidirectional current conducting state. Upon operating in this fashion, the overvoltage sensing means 15 immediately conducts a pulse of current between terminals 17 and 19, and this current supplies a trigger signal ($i_g$) for the control means of the associated main thyristor. Consequently the main thyristor is triggered before the forward bias voltage attains its critical breakover level. Once the main thyristor is turned on, current is diverted from the parallel overvoltage sensing means 15, and the auxiliary thyristors 27, being starved of current, soon turn off. The turnoff of the auxiliary thyristors is assisted by the ringing action of the energy storing means 16.

So long as the overvoltage sensing means 15 always switches from its blocking state to its current conducting state at a magnitude of forward bias voltage that is less than the breakover level of the main thyristor to which it is connected, the main thyristor is properly protected from the adverse consequences of turning on in the voltage breakover mode. The auxiliary thyristors 27 are not damaged by turning on in this mode. This is because they are individually small, low voltage devices and because they are required to conduct for only a relatively short interval of time. The junction capacitance of such devices is relatively small, thereby avoiding a possible problem of premature, weak triggering of the main thyristor due to capacitor charging current between terminals 17 and 22 as the forward bias voltage approaches its threshold level. The dv/dt capability of the auxiliary thyristors is desirably high, particularly at low temperatures, and immunity to dv/dt firing can be virtually assured by connecting their gate electrodes directly to their respective cathodes as is shown in FIG. 2.

Figure 3:
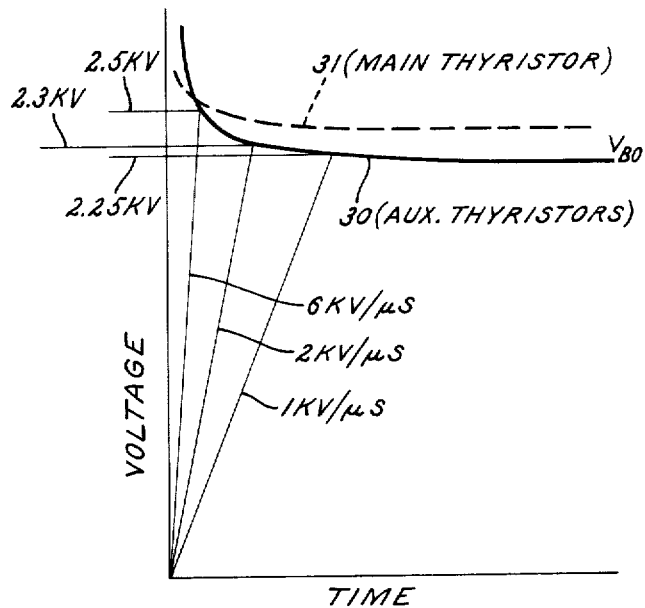
FIG. 3 is a graph of the voltage breakover characteristic of a typical prior art protective circuit.

The voltage breakover level of a thyristor tends to increase at relatively high rates of rise of forward bias voltage. This is because of the inherent time delay in the avalanche action that takes place when the breakover level is reached. The delay is so short (typically 50 to 100 nanoseconds) that its effect is negligible at relatively low rates of rise of forward bias voltage (e.g., less than 500 volts per microsecond). But at higher rates of rise of bias voltage, the voltage breakover level increases noticeably as a function of the rate. This is shown in FIG. 3 where trace 30 represents the threshold magnitude of forward bias voltage that causes the three auxiliary thyristors illustrated in FIG. 2 to switch to their current conducting states. The threshold magnitude is assumed to be 2.2 kV at low rates of rise of forward bias voltage. Assuming that the delay involved in the avalanche action is 50 nanoseconds, the threshold magnitude is increased by 50 volts at 1 kV/$\mu$s, by 100 volts at 2 kV/$\mu$s, and by 300 volts at 6 kV/$\mu$s. It has been discovered that at relatively high dv/dt (e.g., above 3 kV/$\mu$s) the threshold magnitude at which the overvoltage sensing means breaks over may increase to a level higher than the critical breakover voltage of the associated main thyristor (represented by the trace 31 in FIG. 3). If this were to happen, the main thyristor would not be properly protected, and therefore the overvoltage protective circuit should not be applied in any system where forward voltage surges can rise at rates exceeding the rate at which the crossover might occur.

In accordance with our invention, the range of dv/dt to which the overvoltage protective circuit can be safely applied is extended by adding to the overvoltage sensing means 15 suitable means for limiting the increase in the threshold magnitude of forward bias voltage with increasing rates of rise thereof. In FIG. 2 the added means comprises a capacitor 35 connected across one of the PNPN elements 27. The capacitor 35, which has a relatively low value of capacitance (typically of the order of 10 to 100 picofarads), is selected so that its reactance appropriately decreases with increasing rates of rise of forward bias voltage, whereby an increasing proportion of the bias voltage is applied across the other two PNPN elements 27 until the latter elements break over at a bias voltage magnitude lower than that which would cause breakover if the capacitor 35 were omitted. In some cases, it may be desirable to connect an additional capacitor across a second one of the PNPN elements, or to connect grading capacitors of unequal capacitance values across all three elements 27.

Figure 2A:
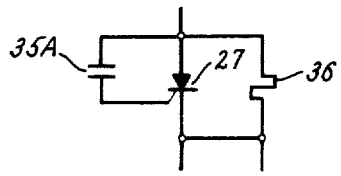
FIG. 2A is a schematic diagram of a modification of part of the circuit shown in FIG. 2.

An alternative scheme for limiting the increase in the threshold magnitude of forward bias voltage with increasing rates of rise thereof is illustrated in FIG. 2A where a capacitor 35A, instead of being connected across a PNPN element 27, is connected between the anode and the gate electrode thereof. As the rate of rise of bias voltage increases, the element 27 will switch to its current conducting state at progressively lower levels of anode voltage due to the combination of gate current flowing through the capacitor 35A and dv/dt action.

In the preceding two paragraphs we have explained how the added capacitor 35 (or 35A) influences the operation of the overvoltage sensing means 15 in the event the applied voltage rises at a relatively constant high rate until the breakover point is reached. The same means will effect a desirable decrease in the threshold magnitude of response to forward voltage surges that start with steep fronts (over 500 volts per microsecond) but taper off to flat peaks below the steady-state breakover level of the main thyristor. Such a surge tends to induce a delayed turn on of the main thyristor due to dv/dt effect, but our improved protective circuit responds earler and triggers the thyristor before it can be damaged by turning on in the dv/dt mode.

Figure 4:
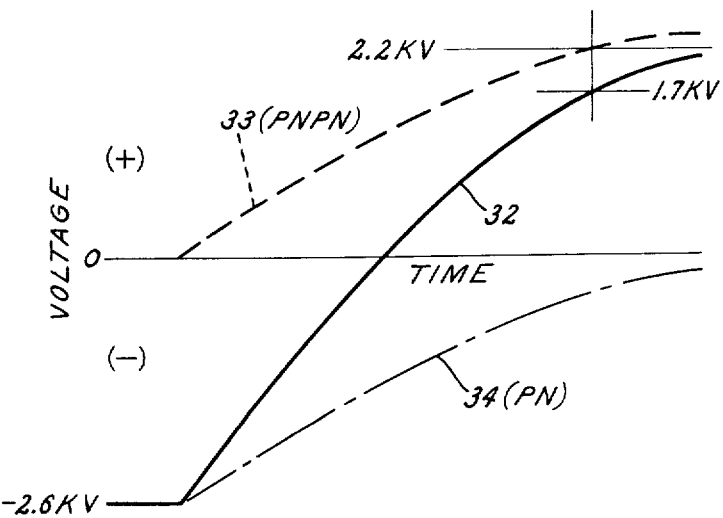
FIG. 4 is a time chart of certain voltages existing in the prior art circuit during a particular surge of bias voltage.

In some applications of the invention, a surge of forward voltage may sometimes be superimposed on an existing reverse bias voltage of high magnitude (i.e., higher than the aforesaid threshold magnitude). When an overvoltage protective circuit constructed in the manner disclosed in our prior patent is reversely biased, practically all of the voltage tends to appear across the PN elements (28) whose back resistance is much higher than that of the PNPN elements (27). It has been discovered that the PNPN elements can breakover at a magnitude of forward bias voltage that is less than the desired threshold magnitude in response to the forward bias voltage rising from the reversely biased state. To understand this phenomenon, it should be noted that the reverse biased PN junction in each of the semiconductor elements 27 and 28 has a certain capacitance (C), and consequently a charging current ($i$) will flow through all of the junctions of these serially connected elements in response to sudden changes in the voltage impressed thereon. Since the internal capacitance of each of the PNPN elements 27 is approximately equal to that of a PN element 28, it can be assumed that the voltage across each must change at substantially the same rate ($dv/dt = i/C$). In FIG. 4, where the trace 32 represents the bias voltage on the main thyristor when rapidly rising in a positive or forward sense from a negative or reverse level of approximately 2,600 volts, the resulting voltage across the PNPN elements is depicted by a broken line 33 and the resulting voltage across the PN elements is depicted by another broken line 34, and both lines have nearly equal slopes. As is there shown, the voltage 33 across the PNPN elements can reach the breakover level thereof (e.g., 2,200 volts) while the magnitude of the forward bias voltage is still relatively low (e.g., in the vicinity of 1,700 volts) and before the latter voltage has attained the critical threshold magnitude at which the protective circuit is intended to operate.

In accordance with our present invention, such improper operation of the overvoltage protective circuit is prevented by adding to the overvoltage sensing means 15 suitable means for dividing between the PNPN and the PN elements any reverse voltage appearing across the main thyristor. In FIG. 2 the added means comprises a plurality of resistors 36 and 37 connected across the respective elements 27 and 28 of the overvoltage sensing means. There is a separate resistor 36 across each PNPN element 27 and a common resistor 37 across the three PN elements 28. These resistors are selected so that the portion of reverse bias voltage distributed across the PN elements 28 is less than a critical fraction "$x$" of the total, which fraction can be calculated from the following equation:

$$x = (V_{Rev} + V_{BO}) [(1 - (C_{28}/C_{27} + C_{28}))]/V_{Rev},$$

where $V_{Rev}$ is the maximum magnitude of reverse voltage that may be impressed across the main electrodes (17, 18) of the protected thyristor; $V_{BO}$ is the level of forward voltage that will cause the PNPN elements in the overvoltage sensing means 15 to breakover; $C_{27}$ is the net value of capacitance of the PNPN elements 27; and $C_{28}$ is the net value of capacitance of the PN elements 28. Thus, by way of example, if $V_{BO} = 2$ kV and $V_{Rev} = 3$ kV, and if $C_{28}$ were assumed equal to $C_{27}$, $x$ is 5/6. In other words, for this example, the reverse voltage across the PN elements must be less than 83.3 percent of the total and the reverse voltage across the PNPN elements must be more than 16.7 percent of the total. Preferably in practice the resistance values of the resistors 36 and 37 are selected so that any reverse bias voltage is divided substantially equally between the PNPN elements, on the one hand, and the PN elements, on the other. This ratio provides an ample margin of safety in the event of a steep-front surge of voltage when the resistance paralleling the PNPN elements is reduced by the effect of the capacitor 35, and yet it preserves sufficient resistance in parallel with the PN elements to avoid untoward leakage through the overvoltage sensing means during cyclic intervals of normal reverse bias. With at least 50 percent of the reverse voltage distributed across the PNPN elements 27, the voltage across these elements is truly equal to the bias voltage across the main thyristor whenever the latter rises to a positive value due to a surge in the forward direction, and the problem outlined in the preceding paragraph of this specification is avoided.

In one practical embodiment of our invention, we contemplate using approximately one megohm for the resistor 37 and approximately the same ohmic total for the three resistors 36. This value of resistance can be apportioned among the separate resistors 36 according to the forward breakover voltages of the respective PNPN elements 27. Alternatively, the voltage dividing resistors 36 can be used to ensure correct operation of the triggering circuit 14 in case the sum of the breakover values of the individual elements 27 exceeds the specified threshold magnitude of the forward bias voltage which is impressed thereacross. For this purpose the relative ohmic values of the resistors 36 should be appropriately altered so that the voltage across at least one of the PNPN elements will attain the breakover level of the corresponding element as soon as the total voltage across the overvoltage sensing means 15 rises in the forward direction to the specified magnitude. To illustrate, assume that $V_{BO} = 2,100$ volts, that two of the PNPN elements have breakover voltage values of 800 volts each, and that the third PNPN element has a breakover value of 700 volts. In this case we would select a 330-kilohm resistor for each of the three resistors 36, whereby the voltage on the third element will attain the breakover value thereof whenever the total forward bias voltage reaches 2,100 volts. As soon as the voltage across the third element attains its breakover value, an avalanche action begins in this element. The avalanche action is characterized by a sharp rise in leakage current, and when this current increases to a certain turn-on magnitude, the third element breaks over or switches to a low-resistance, forward conducting state. So long as the turn-on magnitude of leakage current is negligible, compared to the amount of current in the voltage dividing resistors 36 (approximately 2 milliamps), the avalanche breakdown of the third element takes place substantially instantaneously. Once one of the three PNPN elements breaks over, the other two must follow suit and the overvoltage sensing means abruptly switches from blocking to conducting states. Thus the resistors 36 can be used to obviate the need for selecting PNPN elements having breakover values whose sum precisely equals the specified threshold magnitude of the overvoltage triggering circuit.

As can be seen in FIG. 2, we have also connected a resistor 38 across the isolating diode 20 of our prior art circuit. The purpose of this resistor is to provide a leakage path that keeps the capacitor 24 from accumulating an appreciable charge in the event of a high reverse bias voltage across the main thyristor. This will limit the voltage at the juncture 22 to only a small percentage (e.g., 1.0 percent of the total reverse bias voltage.

While we have shown and described a preferred embodiment of our invention by way of illustration, modifications thereof will probably occur to those skilled in the art. For example, grading capacitors of selected small capacitance values (of the order of 100 picofarads) could be connected in parallel relation to the respective PNPN elements 27 (either in addition to or in lieu of the voltage dividing resistors 36) to force the desired distribution of voltage among the seriesed elements 27 in the event of a steep-front surge of overvoltage, thereby swamping out any adverse influence that the internal capacitances of these elements might have on voltage distribution. We therefore intend, by the concluding claims, to cover all such changes and modifications as fall within the true spirit and scope of the invention.

What we claim as new and desire to secure by Letters Patent of the United States is:

1. For triggering a high-power thyristor, a circuit including overvoltage sensing means connected in series with energy storing means between main terminals of the thyristor and means for coupling the juncture of said sensing means and said energy storing means to the control means of the thyristor, whereby the thyristor is triggered when said sensing means switches from a blocking state to a current conducting state in response to forward bias voltage across said main electrodes rising to a predetermined threshold magnitude, said sensing means comprising a plurality of PNPN semiconductor elements connected in series with at least one PN semiconductor element and poled to conduct current in the same direction as said thyristor, wherein the improvement comprises at least two resistors connected across said PNPN and PN elements, respectively, so as to divide therebetween any reverse voltage appearing across said main electrodes.

2. The circuit of claim 1 wherein said overvoltage sensing means comprises a plurality of PNPN elements and a plurality of PN elements interconnected in series with one another, and wherein the resistance values of said resistors are selected so that the reverse voltage across said PN elements is substantially within a range between 20 and 80 percent of the total reverse voltage across said main electrodes.

3. The circuit of claim 1 wherein said overvoltage sensing means includes means for limiting the increase in said threshold magnitude of forward bias voltage with increasing rates of rise thereof.

4. The circuit of claim 1 wherein said coupling means comprises an isolating diode poled in agreement with said semiconductor elements and a resistor connected across said diode.

5. For triggering a high-power thyristor, a circuit including overvoltage sensing means connected in series with a capacitor between main terminals of the thyristor and means for coupling the juncture of said sensing means and said capacitor to the control means of the thyristor, whereby the thyristor is triggered when said sensing means switches from a blocking state to a current conducting state in response to forward bias voltage across said main electrodes rising to a predetermined threshold magnitude which is lower than the breakover level of said main thyristor, wherein the improvement comprises means associated with said overvoltage sensing means for relatively reducing said threshold magnitude of forward bias voltage as the rate of rise thereof increases.

6. The circuit of claim 5 wherein said overvoltage sensing means comprises a plurality of PNPN semiconductor elements connected in series with one another and poled to conduct current in the same direction as said thyristor, and wherein said threshold magnitude reducing means comprises a capacitor connected across a first one of said elements and having a capacitive value such that said first element and at least another one of said elements have unequal magnitudes of capacitance associated therewith.

7. The circuit of claim 5 wherein said overvoltage sensing means comprises a plurality of auxiliary thyristors interconnected in series with one another and poled to conduct current in the same direction as said high-power thyristor, said auxiliary thyristors being arranged to turn on in a voltage breakover mode in response to said forward bias voltage attaining said threshold magnitude, and wherein said threshold magnitude reducing means comprises a capacitor connected between the anode and the gate electrode of one of said auxiliary thyristors.

8. For protecting a main thyristor having an anode, a cathode, and control means, a circuit including overvoltage sensing means connected in series with energy storing means between said anode and said cathode and means for coupling the juncture of said sensing means and said energy storing means to said control means, whereby the main thyristor is triggered when said sensing means switches from a blocking state to a current conducting state in response to forward bias voltage across said thyristor rising to a predetermined threshold magnitude, said sensing means comprising a plurality of serially interconnected PNPN semiconductor elements which are poled in the same direction as said main thyristor and which have preselected forward breakover voltage values the sum of which exceeds said threshold magnitude, wherein the improvement comprises a plurality of resistors connected across said PNPN elements, respectively, the relative ohmic values of said resistors being so selected that the voltage across at least one of said elements will attain the breakover value of the corresponding element whenever said forward bias voltage rises to said predetermined threshold magnitude.

9. The circuit of claim 8 in which said overvoltage sensing means further comprises at least one PN semiconductor element connected in series and in polarity agreement with said PNPN elements and a resistor connected across said PN element to form with said plurality of resistors a voltage divider for any reverse voltage impressed across said sensing means.

* * * * *